(12) United States Patent
Oberhammer et al.

(10) Patent No.: US 9,977,128 B2
(45) Date of Patent: May 22, 2018

(54) RECORDING METHOD FOR AT LEAST TWO TOF CAMERAS

(71) Applicant: BLUETECHNIX GMBH, Vienna (AT)

(72) Inventors: Roland Oberhammer, Vienna (AT); Robert Hranitzky, Bad Voslau (AT)

(73) Assignee: Bluetechnix, GMBH, Vienna (AT)

( * ) Notice: Subject to any disclaimer, the term of this patent is extended or adjusted under 35 U.S.C. 154(b) by 194 days.

(21) Appl. No.: 14/441,272

(22) PCT Filed: Sep. 11, 2013

(86) PCT No.: PCT/EP2013/068818
§ 371 (c)(1),
(2) Date: Aug. 25, 2015

(87) PCT Pub. No.: WO2014/072100
PCT Pub. Date: May 15, 2014

(65) Prior Publication Data
US 2015/0355330 A1    Dec. 10, 2015

(30) Foreign Application Priority Data
Nov. 8, 2012 (AT) ................................ A 1191/2012

(51) Int. Cl.
*G01S 17/36* (2006.01)
*G01S 17/10* (2006.01)
(Continued)

(52) U.S. Cl.
CPC .............. *G01S 17/36* (2013.01); *G01S 7/487* (2013.01); *G01S 17/102* (2013.01); *G01S 17/89* (2013.01)

(58) Field of Classification Search
CPC .. G01D 5/2451; G01D 5/34746; G01P 3/486; G01P 3/68; G03G 15/5054; G03G 2215/0158
See application file for complete search history.

(56) References Cited

U.S. PATENT DOCUMENTS

2012/0069323 A1* 3/2012 Arimitsu .............. G01D 5/2451
356/28
2012/0098964 A1  4/2012 Oggier et al.

FOREIGN PATENT DOCUMENTS

DE    102010003409    9/2011
DE    102011089636    6/2012
EP       2306426       4/2011

OTHER PUBLICATIONS

Buttgen "Pseudonoise Optical Modulation for Real-Time 3-D Imaging With Minimum Interference" IEEE Transactions on Circuits and Systems I: Regular Papers ( vol. 54, Issue: 10, Oct. 2007 ).*

(Continued)

*Primary Examiner* — Luke D Ratcliffe
(74) *Attorney, Agent, or Firm* — McKee, Voorhees & Sease, PLC

(57) ABSTRACT

The invention relates to a method for recording a scene (3) using at least two time-of-flight cameras (1, 2), which respectively comprise a light source (5) and an image sensor (6), wherein image recording operations which comprise a measuring operation for determining depth information are carried out using each of the at least two time-of-flight cameras (1, 2), wherein the measuring operation comprises the emission of modulated light (11) by the light source (5), the detection of modulated light (12) after the reflection on objects (4) of the scene (3) using the image sensor (6), and the calculation of depth information from the propagation time of the modulated light between the emission and the detection.
In order to increase the image quality, a first time-of-flight camera (1) uses the measurement results of the measuring operation carried out by said camera to determine the extent to which modulated light from a second time-of-flight camera (2) was also detected in this measuring operation in addition to the light (11) emitted by its own light source (5), (Continued)

and the first time-of-flight camera (1) changes the recording mode thereof on the basis of the result of this determination.

6 Claims, 4 Drawing Sheets

(51) Int. Cl.
*G01S 7/487* (2006.01)
*G01S 17/89* (2006.01)

(56) References Cited

OTHER PUBLICATIONS

International Search Report, PCT/EP2013/068818, 3 pages, dated Nov. 25, 2013.
DE 102010003409—IFM Electronic GMBH—English Manual Translation Sep. 29, 2011.
DE 102011089636—PMD Technologie GMBH—English Manual Translation Jun. 28, 2012.
EP 2306426—Kapsch Trafficcom AG—English Manual Translation Apr. 6, 2011.

\* cited by examiner

RECORDING METHOD FOR AT LEAST TWO TOF CAMERAS

CROSS-REFERENCE TO RELATED APPLICATIONS

This is a National Phase application of PCT/EP2013/068818 filed Sep. 11, 2013, which claims priority to AT A1191/2012 filed Nov. 8, 2012, all of which are herein incorporated by reference therein in their entireties.

BACKGROUND OF THE INVENTION

The invention relates to a method for recording a scene using at least two time-of-flight cameras, which respectively comprise a light source and an image sensor, wherein image recording operations which comprise a measuring operation for determining depth information are carried out using each of the at least two time-of-flight cameras, wherein the measuring operation comprises the emission of modulated light by the light source, the detection of modulated light after the reflection on objects of the scene using the image sensor, and the calculation of depth information from the propagation time of the modulated light between the emission and the detection.

Time-of-flight (ToF) cameras concern cameras which not only record a 2D image, but also measure depth information for each recording pixel. Depth information is understood to be information on the distances between the individual objects of a scene and the ToF camera. ToF cameras are also known as active cameras because they are provided their own light source. The light emitted by said light source is reflected on objects of a scene to be recorded and thus reaches the detection region of the image sensor of the camera. The depth information is determined from the reflected light via propagation time or phase difference measurements.

The light sources are usually LEDs (light-emitting devices). Time-of-flight cameras emit modulated light. The light is typically OOK-modified (On-Off Keying) in the megahertz range (e.g. with 20 MHz) and thus emitted into the visual range of the own camera sensor. The reflected light components (photons) are recorded by the camera sensor and used for calculation of the distance of the reflected object. These depth data are then available for applications in addition to the greyscale image. Infrared light is used as illumination in most applications.

ToF cameras are widely used, especially in industry, in traffic telematics and in autonomous robotics. ToF cameras can be used for example in industry as filling-level or distance measuring devices in the close range up to 1 m. ToF cameras can be used as vehicle and person detectors and counters in the range of up to 30 m in traffic telematics. In autonomous robotics, ToF cameras can be used for recognising obstructions and for navigation.

The light of extraneous light sources can influence depth calculation. An image sensor in the form of a PMD chip (photonic mixer device) for example can perform background light suppression for each pixel if the background light does not have the same properties as the emitted modulated light of the camera. This function is typically used for suppressing sunlight or artificial illumination in rooms. In order to achieve suppression, the PMD chip records the light for each pixel when the own light source is switched on and off, and subtracts the two measurement results electronically. Correct suppression of background light is only possible if the intensity of the background light remains constant in all these periods and the PMD chip does not reach electrical saturation. In the case of artificial light sources which are modulated in the megahertz range the suppression does not work completely and the calculated depth data are erroneous in pixels.

Wrong depth calculations in a ToF camera occurs especially when the artificial light sources of other cameras are recorded in the visual range of the own camera sensor. The disturbing extraneous light can be recorded either directly or indirectly via reflections. In these cases, the results of the depth calculation are at least partly invalid.

Several cameras must be used for many fields of application, whose monitoring regions may overlap one another, e.g. in the monitoring of rooms, in traffic telematics, or in the control of several robots. The active light sources of the individual cameras respectively disturb the other cameras in the determination of the depth information because they not only detect the own light but also the light of other cameras, which is also known as extraneous light. These mutual disturbances lead to the consequence that the distance-related measuring results are distorted and the depth information no longer corresponds to the real conditions.

For the purpose of solving this problem, the individual cameras could be networked to each other with respect to control and function for parallel operation, which strongly increases the need for additional equipment however. In this case, the ToF cameras are operated in a network. In addition to data exchange, the network can also be used for synchronising image recordings in order to prevent disturbances of the cameras among each other. For this purpose, time stamps and reservation tokens are exchanged in the network. Only the camera that owns the reservation tokens is entitled to perform image recording. The token can be passed around or be administered centrally in a network server. These measures prevent that the measuring operations of two cameras influence each other during the recording of a scene. Precautions are thus taken in this solution that the modulated light of a camera is not emitted during the measuring or detection process of another camera.

Problems in the networking of ToF cameras according to this principle arise in such a way that this approach entails considerable additional costs of materials and development work. Furthermore, network latency can have a negative effect on the image throughput of the system as a result of the transfer duration of the reservation tokens. Similarly, this mechanism does not take the visual ranges of the cameras into account because a disturbance can only be expected in overlapping visual ranges.

Especially in applications in which the individual cameras move, a more or less complex mechanism would have to consider the continually changing overlapping visual ranges in order to maintain a high level of the image throughput with minimal disturbing effect.

The reliability of image recordings in networks also depends on the reliability of transferring the reservation tokens to all cameras.

In addition to these problems concerning data and control technology, the high costs for such equipment requirements concerning the connection, networking in a common signalling system, and the required complex software are often the reason that the mutual disturbances of the ToF cameras are not considered at all, which has a negative effect on the quality of the determined depth information.

SUMMARY OF THE INVENTION

It is the object of the present invention to provide a method which does not have these disadvantages and which eliminates, or at least reduces, the mutual negative influence of several ToF cameras. This shall be achieved with a low need for equipment. Networking of the individual cameras among each other by a common data or control network shall no longer be necessary. In contrast to the aforementioned solution according to the state of the art, the precision in the determination of the depth information shall be increased without increasing the need for additional equipment.

This object is achieved by the aforementioned method in such a way that a first time-of-flight camera uses the measurement results of the measuring operation carried out by said camera to determine the extent to which modulated light from a second time-of-flight camera was also detected in this measuring operation in addition to the light emitted by its own light source, and the first time-of-flight camera changes the recording mode thereof on the basis of the result of this determination.

The recording mode is changed when modulated light of a second camera is detected or when the detected intensity of the modulated light of a second camera exceeds a threshold value. It is obvious in the case of more than two cameras that the extraneous light of all other cameras is included in the measurement. In order to change the recording mode depending on the image sensor data evaluation, the image sensor and the unit responsible for the modulation of the emitted light are connected to the camera control unit.

The first camera is thus capable, in the presence of modulated light of a second camera in the visual range of the first camera, of changing its recording mode. The camera reacts actively when extraneous light distorting the measuring operation is present. It is prevented by changing the recording mode, e.g. an interruption of the image recording operation, that wrong depth information is determined. Furthermore, an interruption in the image recording operation or the measuring operation ensures that another camera is not disturbed by modulated light during its image recording operation. This substantially improves the image quality of the images, image sequences or video streams recorded by the cameras. The rapidity of imaging and image evaluation can be increased by the autonomous action of the cameras without having to accelerate the control or ensuring high equipment requirements.

It is not necessary that the cameras recording a scene need to be connected to each other with respect to signalling and controls by a network for example. The method in accordance with the invention produces autonomous synchronisation of two or more ToF cameras. A communication or networking of the cameras among each other is not provided in accordance with the invention.

The invention concerns an autonomous method or a method for the indirect coordination of several cameras for reducing disturbances in the depth calculation when recording images in the presence of other ToF cameras. A preferred method allows the autonomous recognition of a disturbance, the deactivation of the own light source, and the repetition of the image recording at a later point in time for every single image of a video stream.

This method leads to an indirect synchronisation of all ToF cameras which are able to detect light of the respective other cameras in their visual range, and to a minimisation of the mutual disturbances of the active light sources of said ToF cameras during image recordings, thus improving image quality.

The second time-of-flight camera preferably determines from the measurement results of the measurement process performed by said camera the extent to which modulated light of the first time-of-flight camera was detected during this measuring operation in addition to the light emitted by its own light source, and the second time-of-flight camera changes its recording mode depending on the results of this determination. As a result, not only the first camera has the possibility of adjusting its recording mode to the presence of extraneous light but also the second camera, so that an even more efficient autonomous synchronisation is produced and especially reliable depth information can be determined without significantly reducing the image recording rate.

The change in the recording mode preferably occurs in such a way that the image recording operations are stopped or interrupted for a predetermined period of time. This allows a renewed attempt at a point in time at which the respective other camera does not emit any modulated light.

The change in the recording mode preferably occurs in such a way that the measuring operation for determining the depth information is suspended or interrupted for a predetermined period of time. In this variant, only a two-dimensional image without the depth information could be recorded.

The change in the recording mode preferably occurs in such a way that the modulation frequency of the emitted light is changed for the measuring operation. A different frequency has a lower influence on the respective other camera than the frequency which the sensor modulation signal of the other camera has.

A time-of-flight camera preferably changes its recording mode when the intensity of the modulated light of another time-of-flight camera which is detected by it exceeds a predetermined threshold value. As a result, imaging can be continued with only few errors of depth information at low intensities of extraneous light, and the recording mode is only changed in the case of unacceptable deviations in the determined depth information concerning actual distances within a scene.

The measuring operation is preferably composed of individual measurements with respective different phase difference between the modulation of the emitted light and the sensor modulation signal of the image sensor. This allows a more sensitive detection of modulated extraneous light.

In this embodiment, at least two potential wells are assigned in the image sensor to each pixel. The sensor modulation signal is the changeover signal which controls a changeover between the potential wells.

The measuring operation preferably comprises at least four measurements, wherein the phase differences between the modulation of the emitted light and the sensor modulation signal of the image sensor is $\varphi_0+0°$, $\varphi_0+90°$, $\varphi_0+180°$ and $\varphi_0+270°$ for the individual four measurements, wherein $\varphi_0$ is an output phase difference. This elegantly allows imaging and simultaneously measurement of extraneous light. The output phase difference or offset phase difference $\varphi_0$ is a random value which is preferably 0°.

Four of these images $I(0°)$, $I(90°)$, $I(180°)$ and $I(270°)$ are recorded in this method (according to the four measurements with the phase differences: $\varphi_0+0°$, $\varphi_0+90°$, $\varphi_0+180°$ and $\varphi_0+270°$). In addition to the calculation of the depth information, information can be obtained from these phase images whether or not and to which extent modulated light is present in another camera. This information is preferably determined from the difference between the phase image $I(0°)$ and the phase image $I(180°)$, and the difference between the phase image $I(90°)$ and the phase image $I(270°)$. Ideally, i.e. without extraneous light, $I(0°)$ is equal to $I(180°)$ according to its amount, and $I(90°)$ is equal to $I(270°)$ according to its amount. Any deviation from this relationship allows drawing conclusions on extraneous light from another camera and the extent of the deviation on the intensity of the extraneous light.

In other words, four exposure phases with different phase displacement between modulation of the sensor and the emitted light is used for each depth image. If this mathematical relationship is changed as a result of the influence of extraneous light, conclusions can be drawn on extraneous light and "disturbance cases" can be detected. In these cases, no correct determination of the depth information can be ensured any more. The camera switches itself off in such cases or interrupts its image recording operation and tries again after a predetermined time interval.

A time-of-flight camera preferably performs a measuring operation for the detection of light with deactivated own light source prior to an image recording operation, and the recording mode of said time-of-flight camera is changed depending on the measurement result of said measuring operation. The presence of extraneous light can roughly be assessed in this way already in a preceding measuring operation.

The time-of-flight camera preferably changes its recording mode upon exceeding a predetermined number of failed image recording operations for image recording in such a way that the image recording rate is reduced. This measure reduces the mutual influence of the ToF camera recording a scene with its modulated light.

A preferred embodiment is thus provided in that upon recording a scene with at least two time-of-flight cameras a measuring operation for determining the depth information is performed in each camera within the scope of a recording, wherein the measuring operation is composed of individual measurements with respectively differing phase difference between the emitted light modulation signal and the sensor modulation signal, and it is determined from the measurement results of the measuring operation of a first time-of-flight camera whether extraneous light of a second time-of-flight camera was present during the measuring operation, and the recording mode of the first time-of-flight camera is changed depending on this determination, i.e. in the case of presence of extraneous light.

BRIEF DESCRIPTION OF THE DRAWINGS

Preferred embodiments of the invention are described below in closer detail by reference to the enclosed drawings, wherein.

DETAILED DESCRIPTION OF EXEMPLARY EMBODIMENTS OF THE INVENTION

Figure 1:
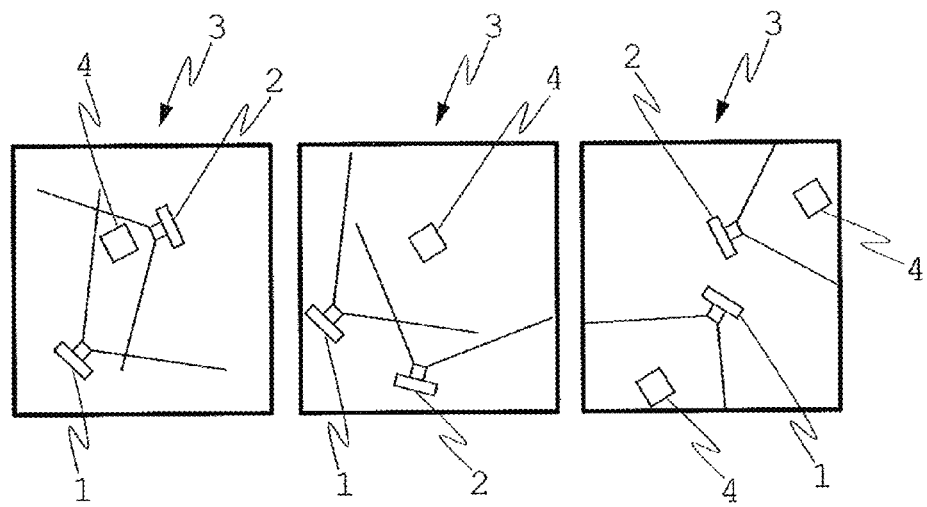
FIG. 1 shows a scene and two cameras recording the scene with their respective visual fields on an object, with strong overlapping (left), with low overlapping (centre), and without overlapping (right) of the visual fields.

FIG. 1 shows a scene 3 consisting of objects 4 in three potential constellations, which scene is to be recorded by means of two time-of-flight cameras 1, 2. In the left constellation, the visual fields of the individual cameras 1, 2 overlap one another to a high extent. Since the cameras are situated opposite of each other, the light of the one camera is co-detected by the other camera in a direct manner, i.e. without prior reflection on an object 4. One must therefore expect a strong mutual influence of the cameras 1, 2 caused by the emitted light and therefore a strong falsification of the determined depth information.

In the constellation shown in the middle, the cameras 1, 2 do not illuminate each other directly, but reflected light of the one camera is co-detected by the respective other camera. In this case too, a mutual influence can also be expected, even though it is lower than in the left constellation. In the constellation shown on the right, the visual fields of the individual cameras 1, 2 face away from each other. Mutual influence is therefore not expected or only to a negligible extent.

Figure 2:
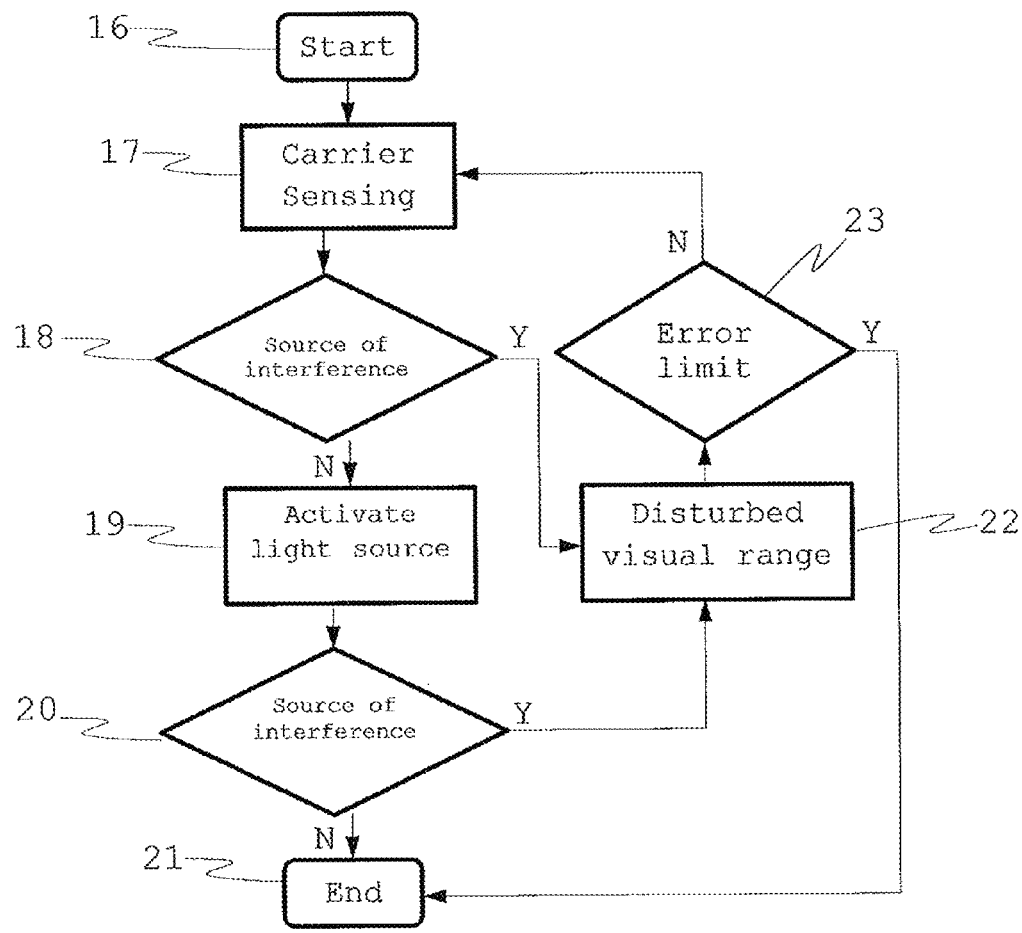
FIG. 2 shows a flowchart of the sequence control of an embodiment of the method in accordance with the invention.

FIG. 2 shows a preferred embodiment of the method in accordance with the invention on the basis of a flowchart with the sequence of the method steps.

After the start 16 of a routine of the time-of-flight camera, a measuring operation 17 is performed at first. It occurs before a planned image recording operation. A detection of any present (extraneous) light is carried out during the measuring operation 17 while the light source is switched off. The camera therefore checks in a first step when its own light source 5 is deactivated (FIG. 3) whether it is able to detect modulated signals from other light sources ("interfering signals") in its visual field. This measuring operation is also known as "carrier sensing". If no disturbing signals are detected, a further measuring operation 19 is carried out after the decision step 18 (source of interference: yes/no), otherwise the system proceeds to step 22.

Figure 3:
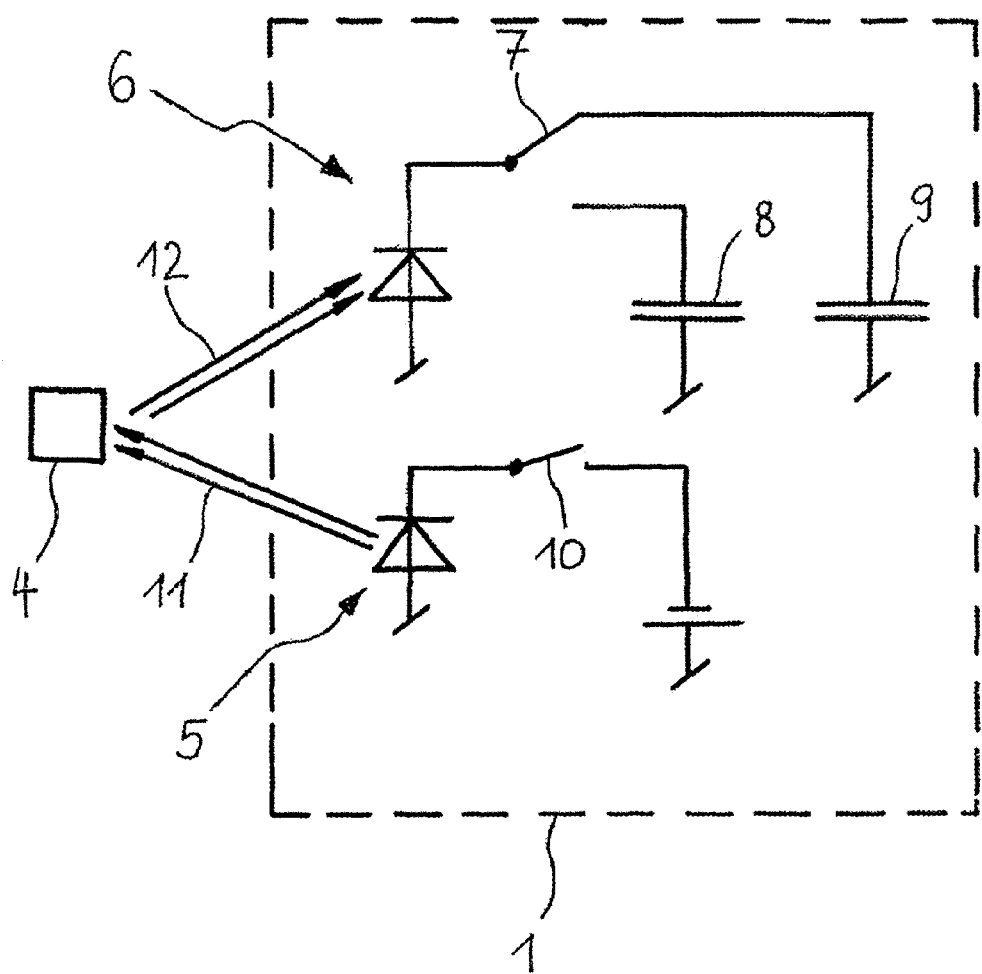
FIG. 3 shows a schematic view of the light source and a portion of the light sensor of a ToF camera, and an emitted light beam and one reflected on an object.

The time-of-flight camera 1, which is schematically shown in FIG. 3, now activates its own light source 5 for the further measuring operation 19. The measuring operation 19 comprises the emission of modulated light 11 by the light source 5 of the camera, the detection of modulated light 12 after the reflection on objects 4 of the scene 3 with the image sensor 6 and the calculation of depth information from the propagation time of the modulated light between emission and detection. The time-of-flight camera 1 determines from the measurement results of the measuring operation 19 that is performed by said camera the extent to which modulated light of a second time-of-flight camera 2 was also detected during this measuring operation in addition to the light 11 emitted by its own light source 5. A preferred embodiment of this measuring operation is described below by reference to FIG. 5.

If no interfering signals are also detected by the measuring operation 19, the check routine ends at reference numeral 21 after the decision step 20 (source of interference: yes/no) and the image recording operation is continued. The depth information is already available because it was co-determined during the measuring operation 19. If on the other hand extraneous light of another time-of-flight camera is detected, the system progresses to step 22.

In step 22, the recording mode of the camera is changed in response to the presence of extraneous light. The time-of-flight camera thus changes its recording mode depending on the results of the measuring operation 19.

A change in the recording mode can occur in such a way that the image recording operations are stopped or interrupted for a predetermined time interval. The camera deactivates its own light source, terminates the recording and must wait for a period of time which can be predetermined or also determined in the randomised manner, and starts again with the first measuring operation 17 (or alternatively with the measuring operation 19).

Alternatively, the change in the recording mode can also occur in such a way that the measuring operation for determining the depth information is suspended or interrupted for a predetermined time interval.

It is a further possibility that the camera changes the modulation frequency of the light 11 emitted by said camera for the measuring operation 19. The camera could thus change the modulation frequency of its own light source and start at the first measuring operation 17 again. This process is also known as "frequency hopping". However, the change in the frequency on the basis of 4-phase calculation (see below) does not offer complete protection from extraneous light disturbances on the preceding frequency. The separation by means of different frequencies only works in the case that the modulated "extraneous light" is applied evenly over all four integration phases. This case is rather improbable in practice without different synchronisation of the image recording between the cameras.

In one embodiment of the invention, a time-of-flight camera 1 can change its recording mode if the intensity of the modulated light of one (or several) other time-of-flight camera 2 which is detected by said time-of-flight camera 1 exceeds a predetermined threshold value.

It is determined in the optional decision step 23 whether an "error limit" has been exceeded. This means that upon reaching or exceeding a maximum number of failed recording attempts for an image recording a message is sent to the control software of the camera. In this case, a reduction in the image recording rate in images per second occurs which can be determined by the application.

Once a recording cycle has ended (end 21), the next recording cycle is started with the measuring operation 17.

The first, simple measuring operation 17 with deactivated own light source is optional, but represents a preferred embodiment because on the one hand the detection of interfering light can become more reliable on the one hand and the check routine can be shortened on the other hand when interfering light can be determined unequivocally already during the first measuring operation 17.

Figure 4:
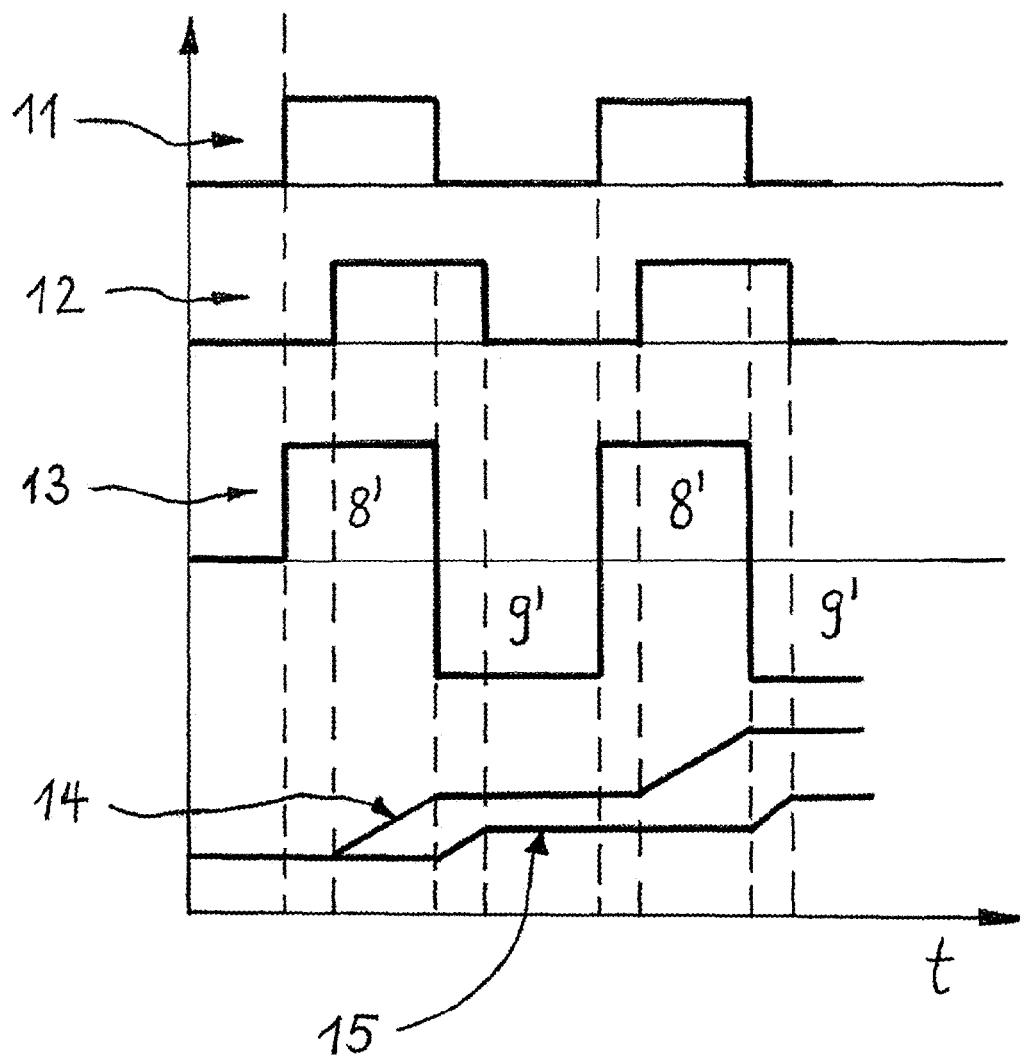
FIG. 4 shows a signal diagram for measuring the propagation time of the light.
Figure 5:
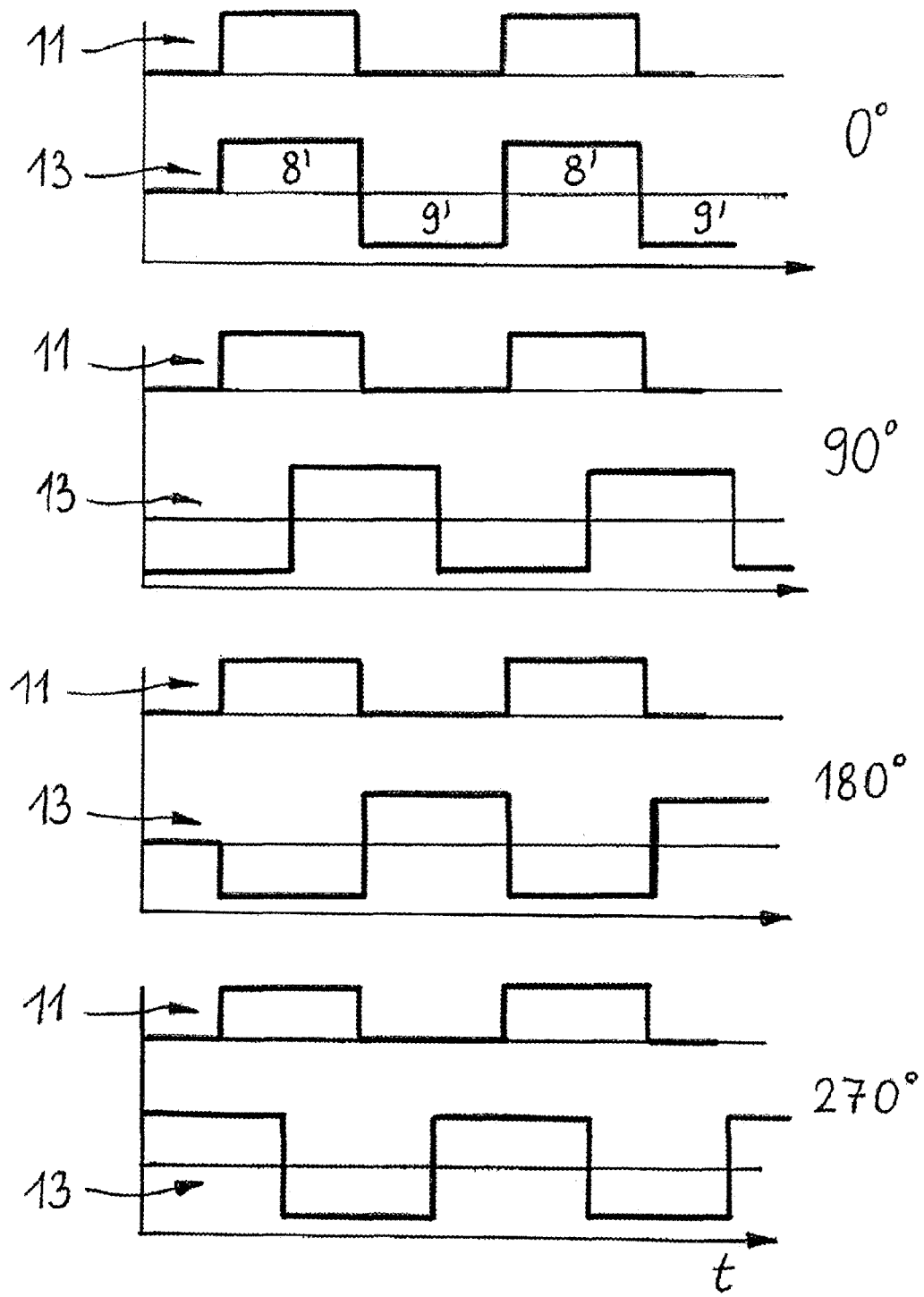
FIG. 5 shows a signal diagram with four measurements with different phase difference between the modulation of the emitted light and the sensor modulation signal.

A preferred measuring operation 19 for determining depth information is described in closer detail by reference to FIGS. 3 to 5.

FIG. 3 shows a time-of-flight camera 1 with a light source 5, especially an LED, for emitting modulated light 5. The switch 10, which is only shown schematically, enables the simple case of an OOK modulation (on-off keying) with a modulation frequency f. It is understood that other modulation methods can also be used. The light 11 emitted by the light source impinges on an object 4 of a scene to be recorded and is reflected by said object. The reflected light 12 is detected by the image sensor 6 of the camera 1. The illustration of the image sensor 6, which is shown in a simplified way in FIG. 3 for the purpose of better clarity, only contains the means required for recording a pixel. An image sensor 6 contains for each pixel a light-sensitive element, e.g. a photodiode, which is associated with at least two potential wells 8, 9. A switch 7 allows the changeover between the two potential wells, so that the charge can be collected in the individual potential wells 8, 9 in an alternating manner (over a predetermined time interval). The changeover between the potential wells occurs via a sensor modulation signal 13 (FIG. 4). The read-out of the potential wells 8, 9 allows access to the image information.

FIG. 4 now shows the modulated light 11 emitted by the light source 5 on the basis of a signal diagram, the reflected light 12 detected by the image sensor 6, the sensor modulation signal 13, the integrated signal 14 which "reaches" the first potential well 8 and the integrated signal 15 which "reaches" the second potential well 9 in temporal progression on top of each other.

The illustration clearly shows that a temporal displacement (phase shifting) occurs as a result of the propagation time between the emitted light signal 11 and the detected light signal 12.

The sensor modulation signal 13 is the changeover signal by means of which changeover is performed between the two potential wells 8, 9. In the illustration of FIG. 4 (and also FIG. 5), the positive part 8' of the sensor modulation signal 13 corresponds to the circuit of the first potential well 8 and the negative part 9' of the sensor modulation signal 13 corresponds to the circuit of the potential well 9. The frequency of the sensor modulation signal 13 corresponds to the modulation frequency of the emitted light 11.

Depending on the time shifting, the integrated signals 14, 15 are differently strong, so that conclusions can be drawn on the propagation time of the light and thus on the distance of the object 4 from the camera 1 from the difference between the integrated signal 14 of the first potential well 8 and the integrated signal 15 of the second potential well 9. Phase shifting is actually detected. If the phase shifting is 0°, the signal is only "up-integrated" in the first potential well 8, whereas the second potential well remains empty. If the phase shifting is 90°, an "equal amount of signal" is collected in the two potential wells 8, 9.

FIG. 5 now shows a special principle of depth calculation, in which the presence of extraneous light, i.e. modulated light from a different camera, can also be checked.

Each pixel consists of two potential wells 8, 9 which are exposed in an alternating fashion with the modulation frequency of the emitted light. The exposure occurs four times, wherein the phase shifting between the sensor modulation signal 13 (potential well changeover) and the modulation of the emitted light 11 is increased by 90° during each exposure. As a result, a nominal phase shifting of 0° is thus obtained for the first exposure, a phase shifting by 90° for the second one, followed by 180° and finally by 270° in the fourth one. An additional phase shifting is obtained for each exposure phase by the distance of the reflected object 4 from the camera 1.

The phase differences between the modulation of the emitted light and the sensor modulation signal of the image sensor is $\varphi_0+0°$, $\varphi_0+90°$, $\varphi_0+180°$ and $\varphi_0+270°$ for each of the four measurements, wherein $\varphi_0$ is an output phase difference or an offset phase difference, which is 0° in the illustrated embodiment, but which can principally be chosen at will.

Signal difference between the two potential wells 8, 9 is output as an exposure value for each pixel and for each of the four different phases (0°, 90°, 180°, 270°), thus producing four phase images I(0°), I(90°), I(180°) and I(270°). A phase image is formed by the difference formation between the signal of the one potential well 8 and the signal of the other potential well 9. The phase images are used as follows for the further calculation.

From the difference between the phase images I(0°) and I(180°) as well as the difference between the phase images I(90°) and I(270°) it is possible to determine the distance d from the object 4 by means of the arc tangent from the quotient. The amount produces the amplitude.

$d \sim \arctan[(I(270°)-I(90°))/(I(180°)-I(0°))]$

From a mathematical standpoint, this concerns a correlation of the two rectangular signals, i.e. the modulation signal of the emitted light 11 and the sensor modulation signal 13, wherein an OOK modulation is basically not mandatory. Instead, any arbitrary form could be used for the modulation signal as long as the light source can be modulated with said signal.

A plausibility check is also made from the individual phase images whether or not extraneous light has falsified the measurement. It occurs in the following way:

The individual values per pixel of the individual phases must exist in a specific relationship in order to enable the performance of a correct depth calculation. If this relationship does not exist, no reliable depth calculation is possible. A potential cause for a breach of this relationship is the influence of extraneous light which does not act equally on all four phase images as a result of the phase difference between the individual measurements which is offset by 90°.

In order to evaluate whether or not extraneous light was present during the measurement, the sum total can be formed from the phase image I(0°) and the phase image I(180°), and the sum total from the phase image I(90°) and the phase image I(270°). These two sum totals must approximately produce 0. If this is not the case, the measurements were influenced by extraneous light and it can be assumed that the determined depth information does correspond to the actual distances.

A collision with other cameras can thus also be determined during an image recording operation. As already explained above with respect to FIG. 2, step 22 is carried out in this case, namely a change in the recording mode of the camera.

The invention is not limited to the described embodiments and the aspects emphasised therein. Rather, a large number of modifications are possible within the inventive idea, which modifications lie within the scope of expert action by the person skilled in the art. It is also possible to realise further embodiments by combination of the aforementioned means and features without departing from the scope of the invention.

The invention claimed is:

1. A method for reducing disturbances in the depth calculation while recording a scene (3) using at least two time-of-flight cameras (1, 2), which respectively comprise a light source (5) and an image sensor (6), wherein image recording operations which comprise a measuring operation for determining depth information are carried out using each of the at least two time-of-flight cameras (1, 2), wherein the measuring operation comprises the emission of modulated light (11) by the light source (5), the detection of modulated light (12) after the reflection on objects (4) of the scene (3) using the image sensor (6), and the calculation of depth information from the propagation time of the modulated light between the emission and the detection, characterized in that a first time-of-flight camera (1) uses the measurement results of the measuring operation carried out by said camera to determine the extent to which modulated light from a second time-of-flight camera (2) was also detected in this measuring operation as extraneous light distorting the measuring operation in addition to the light (11) emitted by its own light source (5), and the first time-of-flight camera (1) changes the recording mode thereof on the basis of the result of this determination, wherein the measuring operation is composed of individual measurements of respectively different phase difference between the modulation of the emitted light (11) and a sensor modulation signal (13) of the image sensor (6), with the frequency of the sensor modulation signal (13) corresponding to the modulation frequency of the emitted light (11), and the change in the recording mode occurs in such a way that the image recording operations are stopped or are interrupted for a predetermined time interval.

2. A method according to claim 1, characterized in that the second time-of-flight camera (2) uses the measurement results of the measuring operation carried out by said camera to determine the extent to which modulated light from the first time-of-flight camera (1) was detected in this measuring operation in addition to the light (11) emitted by its own light source, and the second time-of-flight camera (2) changes the recording mode thereof on the basis of the result of this determination.

3. A method according to claim 1, characterized in that a time-of-provide camera (1, 2) changes its recording mode when the intensity of the modulated light of another time-of-flight camera (2, 1) as detected by said camera exceeds a predetermined threshold value.

4. A method according to claim 1, characterized in that the measuring process comprises at least four measurements, wherein the phase differences between the modulation of the emitted light (11) and the sensor modulation signal (13) of the image sensor (6) are $\varphi 0+0°$, $\varphi 0+90°$, $\varphi 0+180°$ and $\varphi+270°$ for each respective one of the four measurements, wherein $\varphi 0$ is an output phase difference.

5. A method according to claim 1, characterized in that a time-of-flight camera (1, 2) carries out a measuring operation for the detection of light with deactivated own light source (5) prior to an image recording operation, and the recording mode of said time-of-flight camera (1, 2) is changed depending on the measurement result of said measuring operation.

6. A method according to claim 1, characterized in that the time-of-flight camera (1, 2) changes its recording mode upon exceeding a predetermined number of failed image recording operations for an image recording in such a way that the image recording rate is reduced.

* * * * *